(12) United States Patent
Noguchi

(10) Patent No.: US 6,656,379 B2
(45) Date of Patent: Dec. 2, 2003

(54) REFRIGERANT ALTERNATIVE TO CHLORINATED FREON AND METHOD OF MANUFACTURING THEREOF

(75) Inventor: Yukihiro Noguchi, Yokohama (JP)

(73) Assignee: Nihoncontech Co., Ltd., Chiba-Ken (JP)

( * ) Notice: Subject to any disclaimer, the term of this patent is extended or adjusted under 35 U.S.C. 154(b) by 120 days.

(21) Appl. No.: 09/813,316

(22) Filed: Mar. 21, 2001

(65) Prior Publication Data

US 2002/0011586 A1 Jan. 31, 2002

(30) Foreign Application Priority Data

Jun. 19, 2000 (JP) ........................................ 2000-183453

(51) Int. Cl.⁷ ................................................. C09K 5/04
(52) U.S. Cl. ........................................................ 252/67
(58) Field of Search ........................................... 252/67

(56) References Cited

U.S. PATENT DOCUMENTS 5,348,730 A * 9/1994 Greenleaf et al. ............ 424/45

* cited by examiner

Primary Examiner—John Hardee
(74) Attorney, Agent, or Firm—Wenderoth, Lind & Ponack, L.L.P.

(57) ABSTRACT

The present invention provides a refrigerant alternative to chlorinated freon, a conventional refrigerant, that is not inferior to chlorinated freon in refrigerant capacity, is applicable to equipment using chlorinated freon, will not be a factor causing cracking of the ozonosphere, and is well suited for maintaining the environment.

The refrigerant alternative to chlorinated freon according to the present invention comprises it being obtained by mixing HFC134a (having a molecular formula of $CH_2FCF_3$) with ethyl alcohol (having a molecular formula of $C_2H_5OH$) and LPG (propane) (having a molecular formula of $C_2H_8$).

4 Claims, No Drawings

REFRIGERANT ALTERNATIVE TO CHLORINATED FREON AND METHOD OF MANUFACTURING THEREOF

BACKGROUND OF THE INVENTIONS

1. Field of the Inventions

The present invention relates to a novel and extremely useful refrigerant alternative to chlorinated freon, and a method of manufacture thereof.

2. Prior Art

The chlorinated freon, which has conventionally been regarded as a cause for the crack of the ozonosphere, is still used in quantity in the world, therefore, to fully disuse the chlorinated freon, replacing the chlorinated freon with an alternative freon is realistic and also a short cut.

However, when the chlorinated freon is to be replaced with the alternative freon, the following problems are presented.

First, the chlorinated freon must be replaced with the alternative freon together with the compressor, which causes the cost to be raised.

The alternative freon (HFC134a) has a refrigerant capacity lower than that of the chlorinated freon (CFC12).

It is socially requested to provide a substitute meeting the environmental protection requirements that is to be used as a relay until a refrigerant alternative to chlorinated freon is developed.

A tremendous number of people actually utilize small-sized refrigerators containing chlorinated freon, and automobiles which are loaded with an air conditioner using chlorinated freon.

Conventionally, as an HFC mixed refrigerant containing no chlorine that is for use with refrigerators, available is an HFC mixed refrigerant which is composed by adding a trace amount of ethanol, an alcohol having a low molecular weight, to an HFC refrigerant for improvement of the atomization efficiency and the condensation efficiency, and by further adding to it an appropriate amount of a hydrocarbon having a low molecular weight as a pressure modifier.

However, the above mentioned HFC mixed refrigerant containing no chlorine is an HFC mixed refrigerant which offers a high molecular weight and a high viscosity, and separates by itself, and thus is an extremely unstable mixed refrigerant. Thus, it is unsatisfactory and incomplete as a product of this type, and as a result, it cannot be used without making adjustment of the filling pressure for the compressor, for example, and, when used, it has frequently caused the radiator and the like to be destroyed.

Thus, from the viewpoint of terrestrial and worldwide environmental protection, an alternative refrigerant which is applicable to equipment employing chlorinated freon, a conventional refrigerant, must be urgently developed.

PROBLEMS TO BE SOLVED BY THE INVENTIONS

In consideration of these situations, the present invention has been developed to provide an excellent refrigerant which is not inferior to chlorinated freon, a conventional refrigerant, in refrigerant capacity, is widely applicable to equipment using chlorinated freon, will not be a factor causing cracking of the ozonosphere, is well suited for maintaining the environment, and yet is extremely stable for a long period of time, having a good refrigerant efficiency.

MEANS TO SOLVE THE PROBLEMS

The refrigerant alternative to chlorinated freon according to the invention comprises it being obtained by mixing HFC134a (having a molecular formula of $CH_2FCF_3$) with ethyl alcohol (having a molecular formula of $C_2H_5OH$) and LPG (propane) (having a molecular formula of $C_2H_8$), by stirring.

The refrigerant alternative to chlorinated freon according to the invention comprises it being obtained by mixing HFC134a (having a molecular formula of $CH_2FCF_3$) with ethyl alcohol (having a molecular formula of $C_2H_5OH$) at a proportion of 95.00%±1.50% to 3.00%±1.00%, by stirring; by mixing LPG (propane) (having a molecular formula of $C_2H_8$) with this mixture at a percentage of 2.00%±1.00%, by stirring; and by providing the mixture with weak vibrations, then, leaving the mixture so that it has a higher uniformity.

The refrigerant alternative to chlorinated freon according to the invention comprises it being obtained by mixing HFC134a (having a molecular formula of $CH_2FCF_3$) with ethyl alcohol (having a molecular formula of $C_2H_5OH$) having a high purity (a water content of 0.001% or under) at a proportion of 95.00%±1.50% to 3.00%±1.00%, by stirring; by mixing LPG (propane) (having a molecular formula of $C_2H_8$) with this mixture at a percentage of 2.00%±1.00%, by stirring; and by providing the mixture with weak vibrations (for approx. 1 hr), then, leaving the mixture for 100 to 150 hr so that it has a higher uniformity.

According to each of the inventions an excellent refrigerant can be realized which is not inferior to chlorinated freon, a conventional refrigerant, in refrigerant capacity, is applicable to equipment using chlorinated freon, will not be a factor causing cracking of the ozonosphere, and is well suited for maintaining the environment.

The method of manufacture of a refrigerant alternative to chlorinated freon according to the invention comprises the steps of mixing HFC134a (having a molecular formula of $CH_2FCF_3$) with ethyl alcohol (having a molecular formula of $C_2H_5OH$) at a proportion of 95.00%±1.50% to 3.00%±1.00%, by stirring; mixing LPG (propane) (having a molecular formula of $C_2H_8$) with the mixture of said HFC134a and ethyl alcohol (having a molecular formula of $C_2H_5OH$) at a percentage of 2.00%±1.00%, by stirring; and providing the mixture of said HFC134a, ethyl alcohol (having a molecular formula of $C_2H_5OH$) and LPG (propane) (having a molecular formula of $C_2H_8$) with weak vibrations, then, leaving the mixture so that it has a higher uniformity.

The method of manufacture of a refrigerant alternative to chlorinated freon according to the invention comprises the steps of mixing HFC134a (having a molecular formula of $CH_2FCF_3$) with ethyl alcohol (having a molecular formula of $C_2H_5OH$) having a high purity (a water content of 0.001% or under) at a proportion of 95.00%±1.50% to 3.00%±1.00%, by stirring; mixing LPG (propane) (having a molecular formula of $C_2H_8$) with the mixture of said HFC134a and ethyl alcohol (having a molecular formula of $C_2H_5OH$) at a percentage of 2.00%±1.00%, by stirring; and providing the mixture of said HFC134a, ethyl alcohol (having a molecular formula of $C_2H_5OH$) and LPG (propane) (having a molecular formula of $C_2H_8$) with weak vibrations (for approx. 1 hr), then, leaving the mixture for 100 to 150 hr so that it has a higher uniformity.

According to each of the inventions a method by which an excellent refrigerant alternative to chlorinated freon that affords the effect as stated in claim 1 can be manufactured with a simplified process can be provided.

SUMMARY OF THE INVENTIONS

The present invention provides a refrigerant alternative to chlorinated freon, a conventional refrigerant, that is not inferior to chlorinated freon in refrigerant capacity, is applicable to equipment using chlorinated freon, will not be a factor causing cracking of the ozonosphere, and is well suited for maintaining the environment.

The refrigerant alternative to chlorinated freon according to the present invention comprises it being obtained by mixing HFC134a (having a molecular formula of $CH_2FCF_3$) with ethyl alcohol (having a molecular formula of $C_2H_5OH$) and LPG (propane) (having a molecular formula of $C_2H_8$).

DESCRIPTION OF THE PREFERRED EMBODIMENTS

Hereinbelow, a refrigerant alternative to chlorinated freon and a method of manufacture thereof according to the embodiment of the present invention will be described in detail.

First, the method of manufacturing the refrigerant alternative to chlorinated freon according to the embodiment of the present invention will be described.

HFC134a (having a molecular formula of $CH_2FCF_3$ with no chlorine ingredient) is mixed with ethyl alcohol at a proportion of 95.00%±1.50% to 3.00%±1.00%, by stirring, and after checking for transparency, the mixture is left for increased uniformity.

Next, LPG (propane) (which has a molecular formula of $C_2H_8$) is mixed with this mixture at a percentage of 2.00%±1.00%, by stirring.

The ethyl alcohol used must have a purity as high as 99.99% or over with the water content being as low as 0.001% or under.

If the purity of said ethyl alcohol is lower than 99.99%, the water in the ethyl alcohol may cause turbidity or decomposition, resulting in a different gas being produced.

If the above steps of mixing by stirring are reversed, molecule mixing is caused, which also results in a different gas being produced with the transparency being lost.

The gas mixed by stirring is processed with a rolling device for approx. 6 min. to 10 min. At this time, the gas is yet a combustible gas.

After being left for approx. 1 hr, the gas is provided with a weak vibration (as weak as car rocking) by an appropriate vibrating means for 1 hr, then, the mixture is left for 100 to 150 hr, preferably, 120 hr so that it has a higher uniformity.

By doing this, the different molecules in the mixture are further mixed with each other, resulting in a simple substance (basically a mixture) being obtained, which is an incombustible gas based on the molecular balance, i.e., the refrigerant alternative to chlorinated freon according to the present invention.

Table 1 gives the molecular weights, physical properties, and chemical properties of the refrigerant alternative to chlorinated freon according to the present invention, and those of CFC12 and HFC134a.

TABLE 1

| Characteristics | | Refrigerant | | |
| --- | --- | --- | --- | --- |
| Name of refrigerant | | CFC12 | Embodiment | HFC134a |
| Molecular weight | | 120.91 | 96.80 | 102.03 |

TABLE 1-continued

| Characteristics | | Refrigerant | | |
| --- | --- | --- | --- | --- |
| Life in atmosphere | Year | 130 | 13 | 16 |
| Anathermal factor | CFC11 = 1.0 | 3.0 | 0.24 | 0.25 |
| Ozonosphere crack factor | CFC11 = 1.0 | 1.0 | 0.0 | 0.0 |
| Combustibility | | Non-flammable | Non-flammable | Non-flammable |
| Corrosiveness | | None | None | None |
| Toxicity | | 6 | PAFT1 | PAFT1 |
| Lubricant | | Mineral oil | Mineral oil | Synthetic oil |
| Boiling point (1 atm) | K. | 243.36 | 245.06 | 246.97 |
| | °C. | −29.79 | −28.09 | −26.18 |
| Critical pressure | MPa | 4.125 | 4.079 | 4.065 |
| | kgf/cm² · abs | 42.06 | 41.6 | 41.45 |
| Critical density | kg/m³ | 558 | 509 | 511 |
| Latent heat of vaporization (25° C.) | kcal/kg | 33.20 | 41.43 | 42.54 |

The refrigerant alternative to chlorinated freon according to the present invention that is obtained by the above-stated manufacturing method has the following features:

(1) It provides a refrigerant capacity close to that of CFC12.

CFC12 has a boiling point of −29.79° C., while HFC134a having that of −26.18° C., ethyl alcohol having that of −78.32° C., and LPG having that of −42.07° C., thus the insufficiency of HFC134a in boiling point is compensated for with ethyl alcohol and LPG (propane) (having a molecular formula of $C_2H_8$), which are small in molecular size.

(2) It provides a pressure close to that of CFC12.

CFC12 has a pressure of 4206 kPa, while HFC134a has that of 4145 kPa, and LPG (propane) has that of 4200 kPa. The pressures of these are finely adjusted during blending with the use of a cylinder, for example.

(3) The same filling method as that for CFC12 can be adopted.

The CFC12 is compressed, resulting in the temperature being raised to double that of the atmosphere with the pressure being increased, and thus, approximately the same conditions as those for the CFC12 gas basic filling method or the CFC12 liquid-state basic filling method are created.

(4) Compatible with packing (butyl rubber), and using mineral oil

HFC134a, which is a component of the refrigerant alternative to chlorinated freon according to the present invention, is compatible with any rubber other than fluororubber and urethane rubber.

The butyl rubber packing is deteriorated in two months by methyl alcohol, while it will not be deteriorated by ethyl alcohol (when immersed), although discolored; ethyl alcohol is a component of the refrigerant alternative to chlorinated freon according to the present invention.

The lubricant to be used with the refrigerant alternative to chlorinated freon according to the present invention is not the synthetic oil for HFC134a, which is susceptible to alcohol, being decomposed, but the mineral oil used with CFC12, which is resistant to alcohol.

However, it should be noted that the oil to be used with the refrigerant alternative to chlorinated freon according to the present invention must be such that it is vaporized to fine bubbles, and can be easily blended, minimizing the friction between it and the packing or the like, and that it is separated with the lapse of time, when the system is not in service.

(5) It will not crack ozonosphere.

HFC134a will not crack the ozonosphere, although it has an unsatisfactory anathermal factor.

Ethyl alcohol will not crack the ozonosphere, neutralizing a trace amount of chlorine.

LPG (propane) will not crack the ozonosphere, having no anathermal effect, as long as it is not combusted.

EFFECTS OF THE INVENTION

According to the present invention, a novel and extremely useful refrigerant alternative to chlorinated freon can be provided which is not inferior to chlorinated freon in refrigerant capacity, is applicable to equipment using chlorinated freon, will not be a factor causing cracking of the ozonosphere, and is well suited for maintaining the environment.

According to the present invention, a method by which a novel and extremely useful refrigerant alternative to chlorinated freon that affords the above effects can be manufactured with a simplified process can be provided.

What is claimed is:

1. A refrigerant alternative to chlorinated freon, comprising:

it being obtained by mixing HFC134a (having a molecular formula of $CH_2FCF_3$) with ethyl alcohol (having a molecular formula of $C_2H_5OH$) at a proportion of 95.00%±1.50% to 3.00%±1.00%, by stirring;

by mixing LPG (propane) (having a molecular formula of $C_2H_8$) with this mixture at a percentage of 2.00%±1.00%, by stirring; and by providing the mixture with weak vibrations, then, leaving the mixture so that it has a higher uniformity.

2. A refrigerant alternative to chlorinated freon, comprising:

it being obtained by mixing HFC134a (having a molecular formula of $CH_2FCF_3$) with ethyl alcohol (having a molecular formula of $C_2H_5OH$) having a high purity (a water content of 0.001% or under) at a proportion of 95.00%±1.50% to 3.00%±1.00%, by stirring;

by mixing LPG (propane) (having a molecular formula of $C_2H_8$) with this mixture at a percentage of 2.00%±1.00%, by stirring; and by providing the mixture with weak vibrations (for approx. 1 hr), then, leaving the mixture for 100 to 150 hr so that it has a higher uniformity.

3. A method of manufacture of a refrigerant alternative to chlorinated freon, comprising the steps of:

mixing HFC134a (having a molecular formula of $CH_2FCF_3$) with ethyl alcohol (having a molecular formula of $C_2H_5OH$) at a proportion of 95.00%±1.50% to 3.00%±1.00%, by stirring;

mixing LPG (propane) (having a molecular formula of $C_2H_8$) with the mixture of said HFC134a and ethyl alcohol (having a molecular formula of $C_2H_5OH$) at a percentage of 2.00%±1.00%, by stirring; and providing the mixture of said HFC134a, ethyl alcohol (having a molecular formula of $C_2H_5OH$) and LPG (propane) (having a molecular formula of $C_2H_8$) with weak vibrations, then, leaving the mixture so that it has a higher uniformity.

4. A method of manufacture of a refrigerant alternative to chlorinated freon, comprising the steps of:

mixing HFC134a (having a molecular formula of $CH_2FCF_3$) with ethyl alcohol (having a molecular formula of $C_2H_5OH$) having a high purity (a water content of 0.001% or under) at a proportion of 95.00%±1.50% to 3.00%±1.00%, by stirring;

mixing LPG (propane) (having a molecular formula of $C_2H_8$) with the mixture of said HFC134a and ethyl alcohol (having a molecular formula of $C_2H_5OH$) at a percentage of 2.00%±1.00%, by stirring; and providing the mixture of said HFC134a, ethyl alcohol (having a molecular formula of $C_2H_5OH$) and LPG (propane) (having a molecular formula of $C_2H_8$) with weak vibrations (for approx. 1 hr), then, leaving the mixture for 100 to 150 hr so that it has a higher uniformity.

* * * * *